United States Patent [19]
Jaegle et al.

[11] 3,826,996
[45] July 30, 1974

[54] METHOD OF OBTAINING A MEDIUM HAVING A NEGATIVE ABSORPTION COEFFICIENT IN THE X-RAY AND ULTRAVIOLET SPECTRAL RANGE AND A LASER FOR PRACTICAL APPLICATION OF SAID METHOD

[75] Inventors: Pierre Jaegle, Palaiseau; Antoine Carillon, Paris; Pierre Dhez, Gif/Yvette; Gerard Jamelot, Chatenay Malabry; Alain Sureau, Orsay; Michel Cukier, Boulogne; Monique Dupeyrat, Paris; Claudine Vogel, Maisons Alfort, all of France

[73] Assignee: Agence National De Valorisation de la Recherche, Anvar, France

[22] Filed: May 24, 1972

[21] Appl. No.: 256,425

[30] Foreign Application Priority Data
May 28, 1971 France .............................. 71.19432

[52] U.S. Cl. .................. 331/94.5, 330/4.3, 250/504, 250/495
[51] Int. Cl. ............................................. H01s 3/09
[58] Field of Search .................... 331/94.5; 330/4.3; 250/51.5

[56] References Cited
UNITED STATES PATENTS
3,518,427 6/1970 Cotterill ........................... 250/51.5

OTHER PUBLICATIONS
Bond et al., Applied Physics Letters, Vol. 10, No. 8, 15 April 1967, pp. 216–218.
Duguay et al., Applied Physics Letters, Vol. 10, No. 12, 15 June 1967, pp. 350–352.
Dhez et al., J. Applied Physics, 40 (6), May 1969, pp. 545–548.
Carillon et al., Physical Review Letters, Vol. 25, No. 3, 20 July 1967, pp. 140–143.
Physics Today, Vol. 25, No. 10, Oct. 1972, pp. 18–19.
Kepros et al., Proc. Nat. Acad. Sci. (USA), Vol. 69, No. 7, pp. 1744–1745, July 1972.
Physics Today, Vol. 25, No. 1, Jan. 1972, pp. 20.

*Primary Examiner*—John K. Corbin
*Assistant Examiner*—R. J. Webster
*Attorney, Agent, or Firm*—Cameron, Kerkam, Sutton, Stowell & Stowell

[57] ABSTRACT

A plasma is formed from a material in which the ions possess discrete metastable energy states interacting with the energy states of the continuum which are populated by the free electrons of the plasma. Population inversion is achieved between a number of these metastable states and states of lower energy, negative absorption being then produced for the transition which couples the metastable states with said states of lower energy.

In order to form the plasma, a giant-pulse laser beam is caused to interact in vacuum with a solid target formed of said material and is focused within the target near the surface through which the beam passes, the beam power being such as to ensure sufficiently populated metastable states of the ions of the material.

17 Claims, 7 Drawing Figures

PATENTED JUL 30 1974 3,826,996

METHOD OF OBTAINING A MEDIUM HAVING A NEGATIVE ABSORPTION COEFFICIENT IN THE X-RAY AND ULTRAVIOLET SPECTRAL RANGE AND A LASER FOR PRACTICAL APPLICATION OF SAID METHOD

This invention relates to a method for obtaining a medium which exhibits the phenomenon of stimulated emission in the case of radiations within the X-ray and ultraviolet spectral range, that is to say in which the coefficient of absorption of said medium is negative within the spectral regions referred-to as the X-UV range. By X-UV range is meant the electromagnetic radiation comprised approximately between 20 electronvolts and a few Kev of energy, corresponding to wavelengths between 600 A and 1 A approximately. Said medium is capable of producing a radiation having a wavelength within this range and of amplifying said radiation by stimulated emission.

The present invention is also directed to an X-ray ultraviolet laser which entails the application of said method and emits a beam of coherent light within the X-UV range.

The phenomenon of laser emission is well known in the case of wavelengths in the infrared and visible regions. It consists in the amplification of a radiation having a predetermined wavelength within a resonant cavity containing an active medium in which a population inversion of the atomic states is produced by excitation of said medium by optical pumping, for example. To a first-order approximation, it can be stated that the ratio of the coefficient of stimulated emission for a radiation having a wavelength $\lambda$ to the coefficient of spontaneous emission is proportional to $\lambda^3$. In consequence, the de-excitation of an atom in respect of the short wavelengths will take place preferentially by spontaneous emission at the expense of the stimulated emission. This phenomenon constitutes one of the major obstacles to the construction of a X-ray ultraviolet laser.

However, laser action has been obtained in the case of photons having a maximum energy of 8 electronvolts, that is to say for an energy of very distinctly lower value than that which corresponds to the X-UV range. The technique which is employed for the production of said laser action makes use of an electric discharge in molecular hydrogen.

A certain number of attempts have already been made to construct a laser which emits in the X-ray region. Reference can be made in this connection to U.S. Pat. No. 3,484,721 by W. L. Bond et Alia, entitled "X-ray laser" and granted on Dec. 16, 1969. In the device proposed in this document, a laser beam is directed onto a target which is capable of emitting a first spontaneous X-radiation and this latter pumps the material from which it is desired to obtain stimulated X-radiation. This pumping is carried out on the one hand by removal of internal electrons and on the other hand, in accordance with a propagating mode, the spontaneous excitation wave propagates and accompanies the stimulated wave. A device of this type is of very great complexity and has low efficiency since it entails the need for conversion of the radiation emitted by the excitation laser to a first X-radiation which in turn excites the material. The difficulties to be overcome when proceeding in this manner have furthermore been analyzed in an article entitled "Some approaches to vacuum UV and X-ray lasers" by M. A. Duguay et alia, as published in Applied Physics Letters, volume 10, No 12, of June, 15, 1967, page 350.

Another mode of procedure consists in forming a plasma having a high density and a high temperature. A plasma is an electrically neutral state of matter in which this matter is in the form of ions and free electrons. These plasmas are clearly formed within an enclosure in which a high vacuum has been produced. Plasmas having the highest temperatures and the highest densities which can at present be obtained are formed by focusing a beam of laser light on a solid target. Said laser light is emitted in the form of a giant pulse ("triggered" laser) having high power and a length which usually varies between a few nanoseconds and several tens of nanoseconds. In these plasmas, the coefficient of stimulated emission in the case of radiations having very short wavelengths remains on the whole very low in comparison with the coefficient of spontaneous emission. Moreover, these plasmas can be maintained in a state of high energy (high temperature and density) only over a very short time interval (a few tens of nanoseconds). The plasma then expands and its density decreases progressively. It is then observed that recombinations in cascade of the ions and free electrons of the plasma consequently take place. During this stage of recombination which is liable to populate the metastable energy levels of the atoms as in the case of the usual optical pumping techniques, the temperature of the plasma becomes too low to permit the occurrence of stimulated emission within the X-UV range. The production of a high-density, high-temperature plasma is therefore not a sufficient condition.

This invention proposes a method for obtaining a medium which is capable on the one hand of producing a radiation within the X-UV range and, on the other hand, of carrying out amplification by stimulated emission of said radiation which accordingly becomes coherent. The invention also proposes a laser which emits coherent radiation within the X-UV range and entails the application of said method.

More precisely, this invention is directed to a method of obtaining a medium having a negative absorption coefficient within the range comprising the ultraviolet and X-rays, wherein said method essentially consists in forming a plasma from a material in which the ions possess discrete metastable energy states interacting with the energy states of the continuum which are populated by the free electrons of the plasma, and in making said plasma sufficiently dense and hot to cause a population inversion between a number of said metastable states and states of lower energy, the negative absorption being then produced for the transition which connects said metastable states and said states of lower energy.

In accordance with a preferred alternative form of the method, and in order to form said plasma:

a laser beam emitted by a giant-pulse laser is caused to interact under vacuum with a target which is constituted by said material, said laser beam is focused within said target and close to that surface of the target through which said beam passes into said target, the power of said laser beam is selected so as to ensure that said metastable states of the ions of said material are sufficiently populated.

It is therefore apparent that the method according to the invention is distinguished from those of the prior art, especially by two essential characteristic features:

the light beam emitted by the exciting laser acts directly on the medium in which it is desired to achieve population inversion and not on a relay material which converts the incident radiation to X pumping radiation, thereby simplifying the practical application to a very considerable extent and enhancing the efficiency, the plasma is chosen so as to ensure that there should exist metastable states which can be populated by means of an effective interaction mechanism.

The invention also has for its object a laser which emits a coherent light beam within the range which includes the ultraviolet and X-rays and which entails the application of the method hereinabove defined, wherein said laser essentially comprises at least:

one solid target as hereinabove defined and placed in vacuum, means for displacing said target, a laser which produces a light beam in the form of giant pulses, each having a power such as to form a plasma by interaction with said target and such that said discrete metastable energy states of said ions of the plasma should interact with the energy states of the continuum, means for focusing said laser beam and a resonant cavity tuned to the wavelength of the stimulated light within the range comprising the X and ultraviolet rays and fitted with a window through which part of said stimulated light emerges, said plasma being formed on the path of the stimulated light which passes through said cavity and a portion of said path being substantially perpendicular to said laser beam which falls on said target.

A better understanding of the invention will be gained from the following description of two embodiments of the invention which are given by way of explanatory example but without any implied limitation, reference being made to the accompanying drawings, wherein.

Figure 1A:
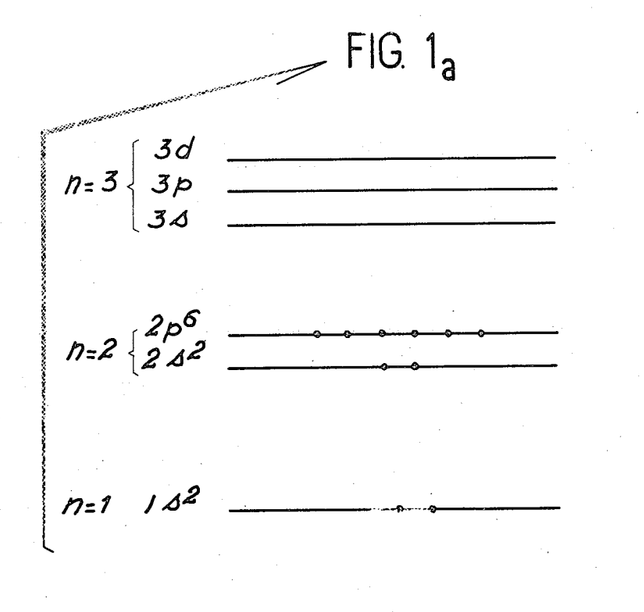
FIGS. 1a and 1b represent the electron energy states of the atom of aluminum which has been ionized three times ($Al^{3+}$)
Figure 1B:
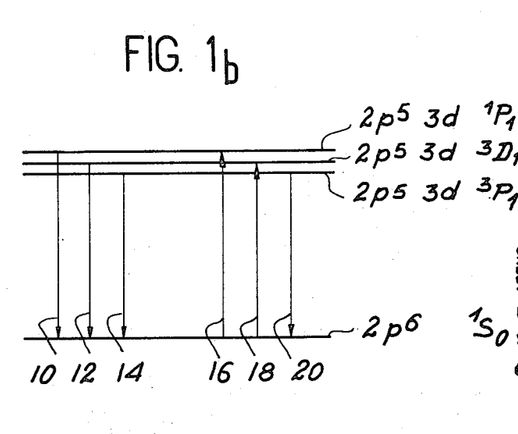

In order that the invention may be understood more completely, it is first necessary to recall a few principles of spectroscopy. To this end, aluminum will be taken as an example. It is known that the atoms of aluminum have thirteen electrons which are distributed in different electron shells corresponding to different discrete energy states. In FIG. 1a which represents the energy state of the $Al^{3+}$ ion in the fundamental state (the $Al^{3+}$ ion has a total of ten electrons), the different electron shells correspond to $n = 1$ and to $n = 2$, the shell $n = 3$ being vacant, wherein $n$ designates the principal quantum number of an electron. The energy levels corresponding to $n = 2$ and $n = 3$ are subdivided respectively into two and three levels. The energy of an electron of one shell is further characterized by its orbital quantum number $l$ which can assume different values designated by $s, p, d, f$, etc. Thus, the energy levels corresponding to $n = 2$ and $n = 3$ are subdivided respectively into two and three energy levels. The electron shell which is nearest to the nucleus of aluminum, which corresponds to $n = 1$, is known as the $1s^2$ shell, wherein 1 designates the value of $n$ or principal quantum number, $s$ characterizes the value of the orbital quantum number $l$ and 2 means that the electron shell can receive a maximum of two electrons (Pauli principle). The first shell which corresponds to the principal quantum number $n = 2$ is designated by $2s^2$ which can receive a maximum of two electrons, the second layer corresponding to $n = 2$ being designated by $2p^6$ which can contain a maximum of six electrons. The electron configuration shown in FIG. 1a corresponds to the $Al^{3+}$ ion in the fundamental state since all the available positions on the different levels are occupied starting from the state $n = 1$. It should be noted that the outer electron shell of the $Al^{3+}$ ion, this shell being designated by $2p^6$, is saturated since all of its six available positions are occupied. If this $Al^{3+}$ ion is excited by supplying energy thereto, the electron configuration of the fundamental state represented in FIG. 1a is modified. Thus it follows that an electron of the shell $2p^6$ can be brought to a higher energy level such as $n = 3$, for example. However, these transitions do not take place in a disordered manner but are governed by rules of selection which make it possible to foresee whether the contemplated transition is permitted. The choice of the selection rule to be applied depends on the manner in which the orbital angular moments and the electron spins are coupled. Assuming by way of example that the $Al^{3+}$ ion in the fundamental state (FIG. 1a) is excited so that one electron of the shell $2p^6$ passes to one of the three shells ($3s, 3p, 3d$) corresponding to the principal quantum number $n = 3$, the transfer to the shell $3p$ is forbidden. Consideration will be given below solely to the transfer of an electron from the shell $2p^6$ to the shell $3d$. When an electron has in fact passed to the shell $3s$, the energy state of the excited $Al^{3+}$ ion is designated by $2p^5 3d$ and, in a general manner, when an electron of the shell $2p^6$ passes to a shell designated by $nd$, the energy state of the $Al^{3+}$ ion is in this case designated by $2p^5 nd$. The departure of an electron from the shell $2p^6$ leaves a "hole" in said shell. The energy state designated by $2p^5 nd$ is in turn subdivided into a plurality of sub-levels depending on the manner in which the electron located in the shell $nd$ is coupled with the "hole" which is left in the shell $2p^6$ (in particular, spin coupling and orbital moments). From this it accordingly follows that the level $3d$ of aluminum is subdivided into three energy levels located fairly close to each other and designated by $2p^5 3d^1 P_1$, $2p^5 3d^3 D_1$ and $2p^5 3d\ ^3P_1$. In these notations, the capital letter P or D represents the value of the total orbital moment of the excited $Al^{3+}$ ion (S corresponds, for example, to a zero value of the total orbital moment), the numeral placed above and to the left of the capital letter P or D indicates the plurality of the energy level (1 corresponds to a singlet energy state and 3 corresponds to a triplet energy state) and the numeral located below and to the right of the capital letter P or D indicates the value of the total angular moment of the ion considered (in the case of all the electrons, Sum of the orbital moments of each electron + Sum in the case of all the electrons of the spin moments of each electron). Thus, in the case of the energy state $2p^6$ which corresponds to the $Al^{3+}$ ion in the fundamental state, all the states corresponding to $n = 1$ and $n = 2$ are completely occupied and the total angular moment is therefore zero, which corresponds to the designation S. In FIG. 1b, the fundamental state of an electron located in the energy state $2p^6$ is therefore designated by $2p^6\ ^1S_0$. The transitions having notations 10, 12 and 14 in FIG. 1b correspond to de-excitation, usually by emission of a photon, of the three energy states corresponding to the level $3d$. These few spectroscopic data would readily apply to ions other than $Al^{3+}$ and to other substances. Consideration can be given by way of example to the $Al^{5+}$ ion in which two electrons of the $Al^{3+}$ ion have been ejected, for example, namely one from the shell $2s^2$ which therefore possesses only one electron and has the notation $2s$, and another electron belonging to the shell $2p^6$ which therefore only has 5, this being written $2p^5$. Identification of such a state corresponds therefore to the notation $2s\ 2p^5$ or, more completely, $2s\ 2p^5\ ^1P_1$; in the case of the same ion which has been changed five times, it is also possible to have a state $2s\ 2p^4\ 3s\ ^1S_0$, etc. These few spectroscopic data will facilitate the description of the invention which now follows.

It is known that, when a laser beam of sufficient power is focused on a metallic target, this results in evaporation of a portion of said target and in formation of a plasma. There will now be discussed by way of example the case of a plasma which is formed from an aluminum target. The spectroscopic study of aluminum plasma which is carried out at wavelengths within the range of 50 A and 300 A shows that the hottest part of the plasma which is located at less than 1 mm from the surface of the target through which the laser beam passes (the most distant zones of the plasma correspond to the expansion of the plasma and therefore to the coldest parts), contains mainly aluminum ions which have lost from 4 to 10 electrons and that the $Al^{3+}$ ions to which attention will be given hereinafter appear primarily as a product of recombination at the moment when the plasma cools down, that is to say after a time-delay (50 to 100 nanoseconds after initiation of the laser pulse) and at a distance from the target (2 to 5 mm).

The $Al^{3+}$ ions possess metastable energy levels, that is to say energy levels having a long lifetime and designated spectroscopically by $2p^5\ nd\ ^3P_1$, wherein $n$ can assume the values 3, 4, 5, 6 and so forth. The metastable character of these levels arises from the fact that the transition from each of these level to the fundamental level $2p^6\ ^1S_0$ of $Al^{3+}$ is forbidden or permitted only to a very slight extent by the rules of selection. The term "metastable" must be understood to designate a relative property since the lifetimes of such states are in any case of short duration of the order of one nanosecond, for example; nevertheless, this lifetime exceeds by several orders of magnitude the lifetimes of the non-metastable levels corresponding to permitted transitions to the fundamental level. This metastable character is confirmed by experiment which shows that the corresponding emission lines have a very low intensity in spark spectra as in the cold zone of the plasma (at 2 or 3 mm from the target, for example). In the table given below (Table I), column 1 gives the emission wavelengths, in Angstroms, of the $Al^{3+}$ lines whose energy states would be represented in FIG. 1b by replacing $n = 3$ (in $3d$) by $n = 4$; column 2 gives the energy levels corresponding to these lines in the case of $n = 4$; column 3 gives the relative theoretical (calculated) intensities of these lines (the calculations being made on the assumption that the spin-orbit coupling is of $j$–$j$ type); column 4 gives the relative intensities of these lines as obtained experimentally from spark spectra (which corresponds to a cold plasma or to a cold zone of an expanding hot plasma); and columns 5 and 6 give the relative intensities of these emission lines in a laser plasma respectively at a distance of 1.25 mm and 0.4 mm from the surface of the target.

TABLE I

| 1<br>λ (A) | 2<br>Transitions | 3 | Intensities<br>4 | 5 | 6 |
|---|---|---|---|---|---|
| 116.46 | $2p^6\ ^1S_0 - 2p^5\ 4d\ ^1P_1$ | 5 | 7 | 5 | −1 |
| 116.92 | $2p^6\ ^1S_0 - 2p^5\ 4d\ ^3D_1$ | 9 | 5 | 5 | −1 |
| 117.41 | $2p^6\ ^1S_0 - 2p^5\ 4d\ ^3P_1$ | 1 | 0 | 2 | 3 |

Figure 2:
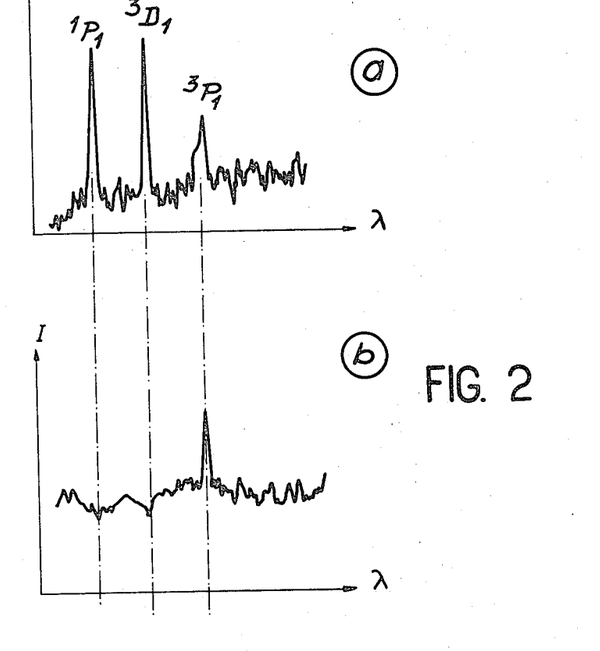
FIGS. 2a and 2b represent the emission spectra (light intensity I as a function of the wavelength $\lambda$) of the $Al^{3+}$ ion of an aluminum plasma for the same power of the laser beam (80 MW) and at a distance respectively of 1.25 mm and 0.4 mm from the target surface through which the laser beam passes.

Columns 3 and 4 of this table point very clearly to the metastable character of the line emitted at 117.41 A. It is also noted with reference to columns 5 and 6 that, in the hot zone of the plasma (column 6), there is obtained a considerable relative strengthening of line $2p^6\ ^1S_0 - 2p^5 4d\ ^3P_1$, whereas the two other lines of the $Al^{3+}$ ions are not emitted but absorbed (sign −). These results are also confirmed by the curves of FIGS. 2a and 2b which represent the emission spectra of the $Al^{3+}$ ion (transitions to the fundamental state $2p^6\ ^1S_0$ starting from $2p^5\ 4d\ ^1P_1$ having the notation $^1P_1$, starting from $2p^5\ 4d\ ^3D_1$ having the notation $^3D_1$ and starting from $2p^5\ 4d\ ^3P_1$ having the notation $^3P_1$). These curves are obtained in the case of a power of the laser beam falling on the target of 80 MW, the observed plasma zone being located at a distance of 1.25 mm from the surface of the target (FIG. 2a) and at a distance of 0.4 mm (FIG. 2b). It is observed that, in the case of a hot plasma (FIG. 2b), the lines $^1P_1$ and $^3D_1$ are practically not emitted whereas the line $^3P_1$ corresponding to de-excitation of a metastable state is emitted with a wholly unexpected intensity.

Figure 3:
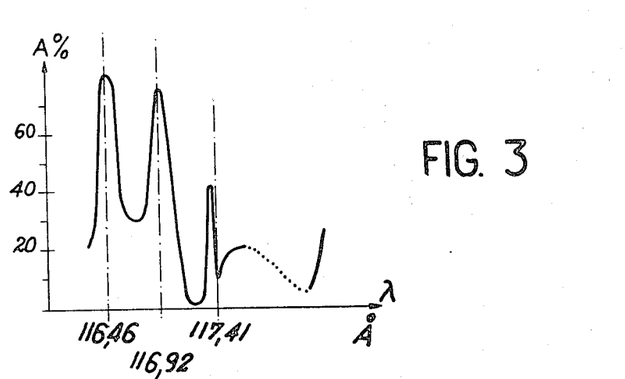
FIG. 3 represents the absorption curve of an aluminum plasma in which the absorption corresponds to the $Al^{3+}$ ions.

FIG. 3 represents the absorption spectrum of an aluminum plasma within the range of emission wavelengths of $Al^{3+}$ ions in the case of a power of 25 MW of the incident laser beam which forms the plasma. The absorption A is given as a percentage and the wavelength λ in A. It is observed that the two first lines $^1P_1$ and $^3D_1$ are very strongly absorbed whereas the line $^3P_1$ which corresponds to the metastable level of the $Al^{3+}$ ion is practically not absorbed. It is this transition in particular, namely $2p^5\ 4d\ ^3P_1 \quad 2p^6\ ^1S_0$ of the $Al^{3+}$ ion which, in accordance with the present invention, is capable of giving rise to a stimulated emission (located at 117.41 A in this case). This phenomenon of stimulated emission which would be represented on the curve of FIG. 3 and in the case of 117.41 A by a negative value of the absorption A is not indicated on this curve by reason of the very small volume of plasma which is present: amplification of light by stimulated emission cannot be observed under these conditions. If reference is made in FIG. 1b to the diagram of the energy levels of the $Al^{3+}$ ion, this corresponds to the fact that the absorptions 16 and 18 and the emission 20 are obtained in a sufficiently hot plasma. It can thus be understood intuitively that, in the hot zone of an aluminum plasma, a population inversion can be obtained between the two levels $^3P_1$ and $^1S_0$ of $Al^{3+}$, on the one hand by virtue of the fact that the level $^3p_1$ is metastable and on the other hand by reason of the fact that the transitions 16 and 18 (FIG. 1b) play an effective part in depopulating the fundamental level $^1S_0$. These results also show that the levels $^1P_1$ and $^3D_1$ have very short lifetimes.

In order to achieve a population inversion between $^3P_1$ and $^1S_0$, focusing of the laser beam must be carried out slightly within the interior of the target rather than on the surface of the target. This experimental condition is conducive to the attainment of adequate temperature and density of the plasma. In the event of utilization of a simple focusing lens, the focal point of the laser beam (namely the zone having the highest energy density) can advantageously be located within the target at a distance ranging from 0.05 mm to 0.3 mm approximately from the surface of the target through which the laser beam passes. This focusing of the beam within the interior of the target is an important factor in the final attainment of the desired result. Similarly, the observation of the plasma zone under study must be made substantially at right angles to the axis of the laser beam and therefore substantially at right angles to the axis of symmetry of the expanding plasma. In point of fact, an observation made at an oblique angle with respect to the axis of the laser beam is not advantageous by reason of the absorption of the stimulated light, this absorption being produced by ions undergoing recombination. The following theoretical explanation of the phenomena which are described herein serve to show that the results obtained can be extended to wavelengths other than 117.42 A and to substances other than aluminum which has been considered only by way of example.

The plasmas formed by interaction of a laser beam with a solid target are usually of very high density, which means that they contain a very high number of free electrons, with the result that it becomes necessary to define the so-called "continuum". It is known that two adjacent levels of electron energy are closer together as they are located nearer the level corresponding to ionization of the atom or of the ion considered. The higher energy levels are therefore very close together and form a "continuum" of states above the ionization limit. By way of example and in the case of the hydrogen atom, the resolution of the Schrodinger equation relating to the hydrogen atom gives all the possible states of this atom. It can be verified by calculation that the discrete energy states become more and more closely grouped together as they are located nearer the ionization level of this atom. One may also continue to determine the solutions of the Schrodinger equation aforesaid, not for discrete states, but for continuous energy states which are located above the ionization level. Below this level, there is described a system comprising the hydrogen nucleus and the electron which is bound to said nucleus; above this level, the system described comprises the hydrogen ion $H^+$ and one electron which is not bound to said ion (free electron). The series of continuous states of free electrons forms what is known as a continuum. The foregoing remarks in connection with the hydrogen atom naturally remain valid in the case of the atoms of other elements. In a plasma, all the continuous states of the continuum are not "occupied" by free electrons: they exist in the quantum-mechanical sense of the term and there can be associated with each state a wave function which is characteristic of the probability of presence of an electron in this state. In a plasma formed by the laser beam, the continuum states are highly populated since these plasmas contain a large number of free electrons. There has already been given a description of the excited energy states of the $Al^{3+}$ ion by $2p^5$ nd, wherein $n$ can assume all the whole values which are higher than or equal to 3. If the ionization energy of said $Al^{3+}$ is exceeded, there are obtained an $Al^{4+}$ ion and a free electron. The system constituted by the $Al^{4+}$ ion and by the electron which has become free can always be described by a state $2p^5\epsilon d$, wherein $\epsilon$ is a continuous variable which takes the place of the quantum number $n$. There can take place an interaction between an energy state corresponding to a predetermined value of $n$ below the level of ionization energy and a continuum state characterized by a value $\epsilon$. In fact, the wave function of this system which characterizes the probability of existence of said system is described by a linear combination of the wave functions of each of the two states of the ion and of the electron. As is in fact known, it is not correct, from the quantum-mechanical viewpoint, to describe an atomic system by means of discrete electron levels each corresponding to a single-electron wave function. The real electron states are in fact a mixture of single-electron states, with the result that an electron which occupies a predetermined energy level has a non-zero probability of presence outside said energy level, the probability of presence in the effectively occupied level being greater than the other probabilities. The wave function of an energy state is thus expressed by a linear combination of wave functions which each describe a single-electron state.

If reference is again made to the aluminum plasma, this latter mainly contains ions which are positively charged at least four times, the ions which are positively charged three times being present but almost exclusively in the states $2p^5$ nd $^3P_1$ (see FIG. 1b in which $n = 3$) and their number in these states is comparable with the number of ions which are positively charged four times. The plasma thus contains a high number of $Al^{4+}$ ions in the presence of a very high density of free electrons ($10^{20}$ to $10^{21}$ electrons/cm$^3$). The creation of an $Al^{3+}$ population in the energy states $2p^5$ nd $^3P_1$ is carried out by interaction between these discrete states of the ion and the states of the $Al^{4+}$ continuum which are occupied by free electrons. This is in fact a particular process of "recombination" of the $Al^{4+}$ ions. In this type of "recombination", the coupling between an $Al^{4+}$ ion and a free electron in an energy state $\epsilon d$ of the continuum is very strong, which enables the $Al^{4+}$ ion in the fundamental state to "capture" said free electron. Thus, a system composed of an $Al^{4+}$ ion and of a free electron is equivalent to an $Al^{3+}$ ion in an energy state $2p^5$ nd. This equivalence results from the resonance between the state $2p^5$ nd and the states of the continuum. This capture mechanism is applicable to the neighboring states $^1P_1$, $^3D_1$ and $^3P_1$ (as shown in FIG. 1b), but the third single state $^3P_1$ is metastable and remains populated whilst the two other states have short lifetimes. Since this capture phenomenon is a resonance effect, it is necessary to ensure that the energy of the free electrons is limited to a predetermined range: it is therefore important to determine experimentally, for example, the appropriate and adequate temperature and density of the plasma. The remarks which have just been made with reference to the aluminum ions remain valid in the case of other elements and in particular in the case of all the ions belonging to the isoelectronic sequence such as $Al^{3+}$ ($Na^{1+}$, $Mg^{2+}$, $Si^{4+}$, etc.). It may be ensured that the population inversion can be produced by this process of "capture" between levels which are capable of giving rise to a stimulated emission at energies in excess of 1 KeV. The invention can also be extended to ions belonging to other isoelectronic sequences and possessing metastable levels which interact either directly or indirectly with the energy states of the continuum which are populated by the free electrons of the plasma. From this it follows that the $Al^{5+}$ ions are also of great interest. As has been recalled in the foregoing, some states of these ions correspond to an absence of electrons within the inner shell 2s. A transition which is particularly capable of producing a stimulated emission is, in the case of the $Al^{5+}$ ion, the transition $2s\ 2p^5\ ^1P_1 - 2s\ 2p^4\ 3s\ ^1S_0$ which takes place at 106.47 A.

The direct interaction mechanism which has been described above and permits population of the metastable levels can be accompanied by an indirect mechanism which makes use of an intermediate state, in interaction with the metastable states and the states of the continuum. Accordingly, the inventors have shown that the population of the levels $2s^2\ 2p^5$ nd $^3P_1$ can also be carried out by means of an indirect interaction which involves the state $2s\ 2p^6$ np $^3P_1$, which is a self-ionizing state in interaction with the continuum. A plasma having a negative coefficient of absorption for radiations within the X-ultraviolet range can be obtained in accordance with the invention only by ensuring on the one hand that the power of the laser beam is selected correctly with a view to placing the plasma temperature and density within a range corresponding to an energy distribution of free electrons such that the resonance between the metastable levels of the ions and the states of the continuum should be permitted to take place and that, on the other hand, the material constituting the target is selected so as to make certain that said metastable levels can in fact exist.

Figures 4, 5:
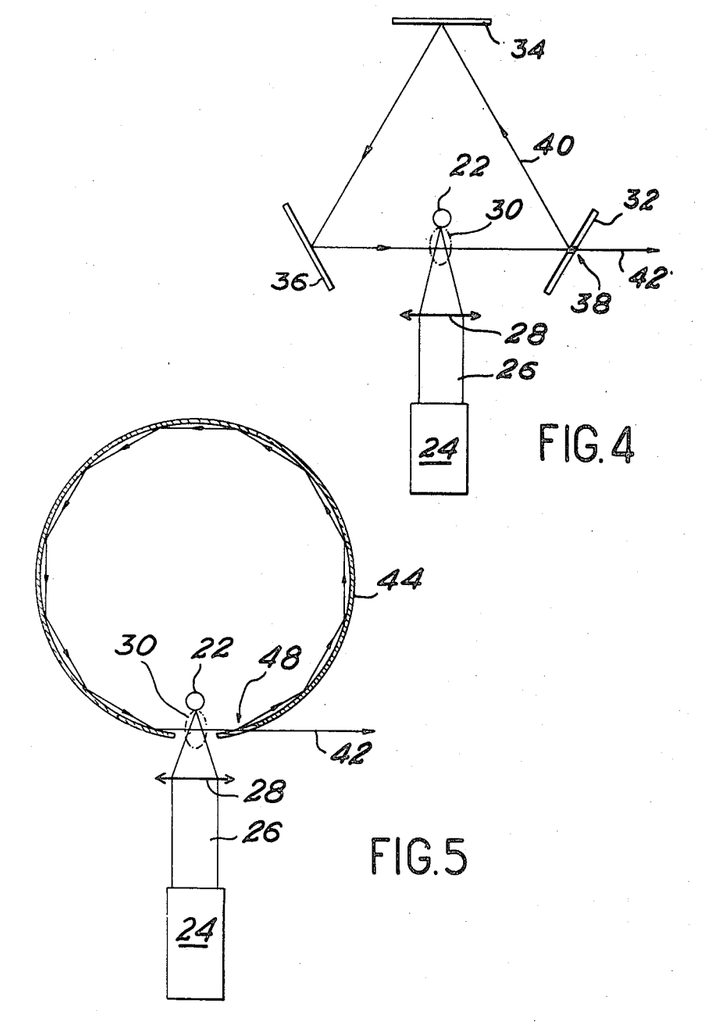
FIGS. 4 and 5 show diagrammatically two advantageous embodiments of a X-ray ultraviolet laser in accordance with the invention.

The invention is also directed to a laser which is capable of emitting coherent radiation in the X-ultraviolet range. FIG. 4 illustrates a first embodiment of said laser. A target 22 of cylindrical shape and advantageously constructed of aluminum is placed under a vacuum. Means (not shown in the drawings) are provided for displacing this target with a view to changing after each laser emission the point of impact of the laser beam on the target. A laser as represented diagrammatically and designated by the reference 24 produces a parallel light beam 26 which is focused by means of an optical system 28 on the target 22. This laser emits giant pulses (laser of the "triggered" type, laser of the neodymium-doped type, for example), each of these pulses having a length which can vary between a few nanoseconds and a few tens of nanoseconds. The optical system 28 can be either a cylindrical or spherical system: in the former case, the plasma 30 which is formed on the target 22 has an elongated shape and in the latter case has a shape which is initially spherical at the moment of formation (prior to expansion). The laser cavity, or resonant cavity, is formed by three crystals 32, 34 and 36 having plane faces, the crystal 32 being provided with a small slit 38 so that part of the light beam 40 which travels within the laser cavity is permitted to escape from this latter so as to form an output beam 42 of coherent light within the X-UV range. The light beam 40 is constituted by the stimulated light emitted by the plasma 30. The crystals 36 and 32 are so arranged that the stimulated light beam 40 passes through the plasma 30 in a direction substantially perpendicular to the axis of the light beam 26 and therefore to the axis of symmetry of the plasma 30. The focal point of the light beam 26 is located by displacing the optical system 28, within the interior of the target 22 and close to the surface of the target through which the laser beam 26 passes. The relative distance from the target 22 to the optical system 28 is adjusted so as to obtain optimum efficiency of population inversion. When the optical system 28 is cylindrical, the formed plasma 30 has an elongated shape and the optical axis of that portion of the resonant cavity which is located between the two crystals 36 and 32 is accordingly placed along the longitudinal axis of the plasma 30 in such manner as to ensure that the coefficient of amplification of the beam 40 is of maximum value. The crystals 32, 34 and 36 receive the light beam 40 at an angle of incidence which is close to the Bragg angle. The distance between the lattice planes of the crystals 32, 34 and 36 must be matched with the wavelength of the light beam 40 and with the angle of reflection which is none other than the Bragg angle (60° in the case of FIG. 4). This is possible by making use of crystals formed by stacking of monomolecular layers which make use of long-chain molecules of the stearate type, for example. However, the use of crystals of more common type is possible at certain wavelengths. The use of three crystals makes it possible to attain the minimum reflection number but this number can be increased in the case in which the lattice-plane distance and the wavelengths result in a Bragg angle which is very different from 60°.

In the second embodiment illustrated in FIG. 5, the resonant cavity is different from the cavity described in the first embodiment. It is known that, although reflection of X-rays from mirrors at a normal angle of incidence close to the perpendicular is impossible, reflection at a grazing angle of incidence is feasible. The resonant cavity 44 shown in FIG. 5 is simply constituted by a mirror formed by the reflecting internal portion of a hollow cylinder. This mirror is provided with an opening through which the laser beam 26 is permitted to pass to the target. The beam 46 of stimulated light to be amplified undergoes a large number of reflections from the internal wall of the cylinder and, on completion of each revolution, passes through the plasma 30 in a direction substantially at right angles to the axis of the light beam 26. That point of the resonant cavity 44 which is designated by the reference 48 can be semi-transparent or consist of a slit, with the result that part of the light beam 46 is permitted to pass out of the cavity so as to form the output beam 42 of the X-ray ultraviolet laser. The resonant cavity 44 can clearly be constituted by $n$ mirrors which form an assembly having a polygonal cross-section. When $n$ is of very substantial value, this results in practice in the circular cross-section of the cavity which is illustrated in FIG. 5. Said $n$ mirrors can be either plane, cylindrical or spherical mirrors. In FIG. 4, the means for forming the plasma 30 are constituted solely by the laser 24. However, it will be apparent to any person who is versed in the art that this plasma could be partly formed by producing an explosion of the target 22 which could in this case be constructed in the form of a fusible wire supplied by electric means which have not been illustrated. In this case, the laser 24 has the design function of heating the plasma 30 which is initially produced by the explosion of the support 22.

There can also be incorporated with the assembly a known device for producing an intense beam of electrons which are directed onto the plasma 30, which has the effect of increasing the electron density of said plasma.

The applications of an X-ray or ultraviolet laser of this type are very numerous. The studies relating to photoionization, photodissociation and photochemistry may be mentioned by way of example. Crystallographic studies are also highly assisted by the use of coherent X-radiation.

What we claim is:

1. A method of obtaining a medium having a negative absorption coefficient within the range comprising the ultra-violet and X-rays including the steps of forming a plasma from aluminum in which the ions possess discrete metastable energy states interacting with the energy states of the continuum which are populated by the free electrons of the plasma, making said plasma sufficiently dense and hot to cause a population inversion between a number of said metastable states and states of lower energy, the negative absorption being then produced for the transition which connects said metastable states and said stages of lower energy, forming the plasma by a laser beam emitted by a giant-pulse laser interacting under vacuum with a target constituted by said aluminum, focusing said laser beam within said target and close to that surface of the target through which said beam passes into said target, and selecting the power of said laser beam to populate said metastable states of the ions of said material.

2. A method of obtaining a medium having a negative absorption coefficient within the range comprising the ultra-violet and X-rays including the steps of forming a plasma from aluminum in which the ions possess discrete metastable energy states interacting with the energy states of the continuum which are populated by the free electrons of the plasma, making said plasma sufficiently dense and hot to cause a population inversion between a number of said metastable states and states of lower energy, the negative absorption being then produced for the transition which connects said metastable states and said stages of lower energy, the plasma being formed by a laser beam emitted by a giant-pulse laser interacting under vacuum with a target constituted by said aluminum, focusing said laser beam within said target and close to that surface of the target through which said beam passes into said target, and selecting the power of said laser beam to populate said metastable states of the ion of said material, forming a first plasma from said aluminum;
interacting the laser beam produced by the giant-pulse laser under vacuum with said first plasma, and focusing said laser beam within the interior of said first plasma and heating said first plasma.

3. A method of obtaining a medium having a negative absorption coefficient within the range comprising the ultra-violet and X-rays including the steps of forming a plasma from aluminum in which the ions possess discrete metastable energy states interacting with the energy states of the continuum which are populated by the free electrons of the plasma, making said plasma sufficiently dense and hot to cause a population inversion between a number of said metastable states and states of lower energy, the negative absorption being then produced for the transition which connects said metastable states and said stages of lower energy, the plasma being formed by a laser beam emitted by a giant-pulse laser interacting under vacuum with a target constituted by said aluminum, focusing said laser beam within said target and close to that surface of the target through which said beam passes into said target, and selecting the power of said laser beam to populate said metastable states of the ion of said aluminum and interacting with said plasma an electron beam and increasing the density of said plasma.

4. A method according to claim 1, wherein the transition for which the absorption coefficient is negative is of the type:

$$ns^2\ np^6\ {}^1S_0 - ns^2\ np^5\ n'd\ {}^3P_1$$

where $n$ represents the principle quantum number of an electron $s, p, d$ and $f$ and represent the orbital quantum number of an electron and P and D represent the value of the total orbital moment of the excited ion.

5. A method according to claim 4, wherein said material is selected from the isoelectronic series of neon, which corresponds to $n = 2$.

6. A method according to claim 5, wherein said material is aluminum, which corresponds to the $Al^{3+}$ ion.

7. A method according to claim 6, wherein $n' = 4$, in which the transition $2s^2\ 2p^6\ {}^1S_0 = 2s^2\ 2p^5\ 4d\ {}^3P_1$ takes place at a wavelength of 117.41 A.

8. A method according to claim 1, wherein the transition at which the absorption coefficient is negative is of the type:

$$ms\ mp^5\ {}^1P_1 - ms\ mp^4\ m's\ {}^1S_o$$

9. A method according to claim 8, wherein $m = 2$.

10. A method according to claim 9, wherein $m' = 3$.

11. A method according to claim 10, wherein said material is aluminum, the corresponding ion being the $Al^{5+}$, and said transition being the transition $2s\ 2p^5\ {}^1P_1 - 2s\ 2p^4\ 3s\ {}^1S_0$ takes place at a wavelength of 106.47 A.

12. Apparatus for obtaining a medium having a negative absorption coefficient within the range comprising the ultra-violet and X-rays including means for forming a plasma from aluminum in which the ions possess discrete metastable energy states interacting with the energy states of the continuum which are populated by the free electrons of the plasma, means for making said plasma sufficiently dense and hot to cause a population inversion between a number of said metastable states and states of lower energy, the negative absorption being then produced for the transition which connects said metastable states and said stages of lower energy, said means for forming and plasma being a laser beam emitted by a giant-pulse laser interacting under vacuum with a target constituted by aluminum means for focusing said laser beam within said target and close to that surface of the target through which said beam passes into said target, and means for selecting the power of said laser beam to populate said metastable states of the ion of said material and an electron beam interacting with said plasma and increasing the density of said plasma.

13. A laser according to claim 12, wherein said resonant cavity comprises at least three crystals which receive the rays of light to be amplified at an angle of incidence which is close to the Bragg angle.

14. A laser according to claim 13, wherein each of said crystals is formed by a stack of monomolecular layers of long-chain stearate molecules.

15. A laser according to claim 14, wherein said molecules belong to the stearate group.

16. A laser according to claim 12, wherein the laser which produces a light beam in the form of giant pulses is a neodymium-doped glass laser.

17. A laser according to claim 12, wherein said means to form a plasma are a Q switched laser with focusing means.

* * * * *